(12) United States Patent
Dumpala et al.

(10) Patent No.: US 11,443,179 B2
(45) Date of Patent: Sep. 13, 2022

(54) SIMULTANEOUS MULTI-CLASS LEARNING FOR DATA CLASSIFICATION

(71) Applicant: Tata Consultancy Services Limited, Mumbai (IN)

(72) Inventors: Sri Harsha Dumpala, Thane (IN); Rupayan Chakraborty, Thane (IN); Sunil Kumar Kopparapu, Thane (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 891 days.

(21) Appl. No.: 15/983,779

(22) Filed: May 18, 2018

(65) Prior Publication Data
US 2019/0042938 A1 Feb. 7, 2019

(30) Foreign Application Priority Data
May 19, 2017 (IN) .............................. 201721017694

(51) Int. Cl.
*G06N 3/08* (2006.01)
*G06N 3/04* (2006.01)
(Continued)

(52) U.S. Cl.
CPC ................. *G06N 3/08* (2013.01); *G06N 3/04* (2013.01); *G06N 3/06* (2013.01); *G06N 3/082* (2013.01); *G06N 20/00* (2019.01)

(58) Field of Classification Search
CPC ............ G06N 3/08; G06N 3/04; G06N 3/082; G06N 3/12; G06N 3/123; G06N 3/126;
(Continued)

(56) References Cited

U.S. PATENT DOCUMENTS

| 2011/0119209 A1* | 5/2011 | Kirshenbaum | .......... G06N 5/02 706/12 |
| 2013/0041856 A1* | 2/2013 | Benitez | ................. G01S 13/867 706/12 |

(Continued)

FOREIGN PATENT DOCUMENTS

| CN | 104573780 A | 4/2015 |
| CN | 105320677 A | 2/2016 |
| CN | 106033432 A | 10/2016 |

OTHER PUBLICATIONS

Yan Xu et al. "Weakly supervised histopathology cancer image segmentation and classification" Medical Image Analysis, Apr. 2014; pp. 591-604 Volume-issue Nos. vol. 18, Issue 3, Elsevier B.V. Link:https://pdfs.semanticscholar.org/342c/e4663b1cbe2a1ca2f0e85bd362a343263568.pdf.

(Continued)

*Primary Examiner* — Shane D Woolwine
(74) *Attorney, Agent, or Firm* — Finnegan, Henderson, Farabow, Garrett & Dunner LLP

(57) ABSTRACT

The disclosure presents herein a method to train a classifier in a machine learning using more than one simultaneous sample to address class imbalance problem in any discriminative classifier. A modified representation of the training dataset is obtained by simultaneously considering features based representations of more than one sample. A modification to an architecture of a classifier is needed into handling the modified date representation of the more than one samples. The modification of the classifier directs same number of units in the input layer as to accept the plurality of simultaneous samples in the training dataset. The output layer will consist of units equal to twice the considered number of classes in the classification task, therefore, the output layer herein will have four units for two-class clas- (Continued)

sification task. The disclosure herein can be implemented to resolve the problem of learning from low resourced data.

6 Claims, 4 Drawing Sheets

(51) Int. Cl.
*G06N 3/06* (2006.01)
*G06N 20/00* (2019.01)

(58) Field of Classification Search
CPC ........ G06N 20/00; G06N 20/10; G06N 20/20; G06N 3/06
USPC .......................................................... 706/20
See application file for complete search history.

(56) References Cited

U.S. PATENT DOCUMENTS

2016/0012352 A1* 1/2016 Peng ...................... G06N 20/00 706/12
2016/0174902 A1* 6/2016 Georgescu ............ G06T 7/0012 600/408
2017/0132362 A1* 5/2017 Skinner .................. G16B 30/00
2017/0243051 A1* 8/2017 Chukka ................ G06K 9/6277

OTHER PUBLICATIONS

Vijay Manikandan Janakiraman et al. " Stochastic gradient based extreme learning machines for stable online learning of advanced combustion engines" Title of the item: Neurocomputing, Date : Feb. 12, 2016, pp. 304-316, Volume-issue No. 177, Publisher: Elsevier B.V, Link: https://pdfs.semanticscholar.org/7f7d/bcc9df4e80e3946b58ebdb4b5981a3b329f4.pdf.

Divya Tomar et al. "A comparison on multi-class classification methods based on least squares twin support vector machine" Knowledge-Based Systems; Date: Jun. 2015 pp. 131-147, Volume-issue No. vol. 81 Publisher: Elsevier B.V Link: https://pdfs.semanticscholar.org/7f7d/bcc9df4e80e3946b58ebdb4b5981a3b329f4.pdf.

* cited by examiner

SIMULTANEOUS MULTI-CLASS LEARNING FOR DATA CLASSIFICATION

PRIORITY CLAIM

This U.S. patent application claims priority under 35 U.S.C. § 119 to India Application No. 201721017694, filed on May 19, 2017. The entire contents of the abovementioned application are incorporated herein by reference.

TECHNICAL FIELD

The disclosure herein generally relates to machine learning and, more particularly to a method for simultaneously multi-class learning for data classification.

BACKGROUND

Typically, an artificial neural network has capability to discriminatively learn class information from input data that is provided during the training. In general, data that belongs to a single class is provided at any given instant as the input to the network for learning the pattern of that class. Hence, the network is able to capture the characteristics of a particular class and learn its pattern so that it can distinguish a class from other classes while testing.

However, the characteristics of the classes are better learned and its discrimination capabilities improve when data belonging to more than one class is provided at the same time to the network for learning. Interestingly, a method of providing more than one class information can foster multiple combinations of integrated class information, which in turn increases the number of samples for training the network.

Therefore, there is a need to have an artificial neural network to additionally learn the differences between the classes when examples for training belonging to different classes are provided to the network at the same time.

SUMMARY

Embodiments of the present disclosure present technological improvements as solutions to one or more of the above-mentioned technical problems recognized by the inventors in conventional arrangements. For example, there is provided a processor implemented method to address class imbalance across a wide degree of imbalance by simultaneously considering a plurality of samples to train a classifier.

In one embodiment, a computer implemented method to train a machine learning classifier using a plurality of samples of a training dataset. The method comprising one or more steps such as considering a feature based data representation of the plurality of samples of the training dataset simultaneously; modifying the considered data representation of the training dataset to consider the plurality of simultaneous samples of the training dataset; modifying an architecture of the machine learning classifier to handle the modified data representation of the plurality of samples and training the modified machine learning classifier using the modified data representation of the plurality of samples. Further the method allowing a voting based decision mechanism on a test sample using a single classifier of the machine learning.

It would be appreciated that the multiple instances of the test samples can be generated from a test sample by using one or more known reference samples, which can be taken from the training dataset. The modified architecture of the machine learning classifier includes a multilayer perceptron (MLP). The modified machine learning classifier comprises an input layer, a hidden layer and an output layer. The input layer of the modified classifier comprises same number of units as to accept the plurality of simultaneous samples of the training dataset. Similarly, the output layer comprising units double to number of simultaneous samples.

It is to be understood that the foregoing general description and the following detailed description are exemplary and explanatory only and are not restrictive of the invention, as claimed.

BRIEF DESCRIPTION OF DRAWINGS

The embodiments herein will be better understood from the following detailed description with reference to the drawings, in which.

DETAILED DESCRIPTION

The embodiments herein and the various features and advantageous details thereof are explained with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The present disclosure provides herein a computer implemented method to train a machine learning classifier using a plurality of samples in a training dataset. It would be appreciated that the disclosure herein is to address on both balanced and imbalanced class distribution problem in the machine learning. Further, the method is also based on voting based decision mechanism, which is obtained using only a single base classifier of the machine learning but not an ensemble of classifiers.

Figure 1:
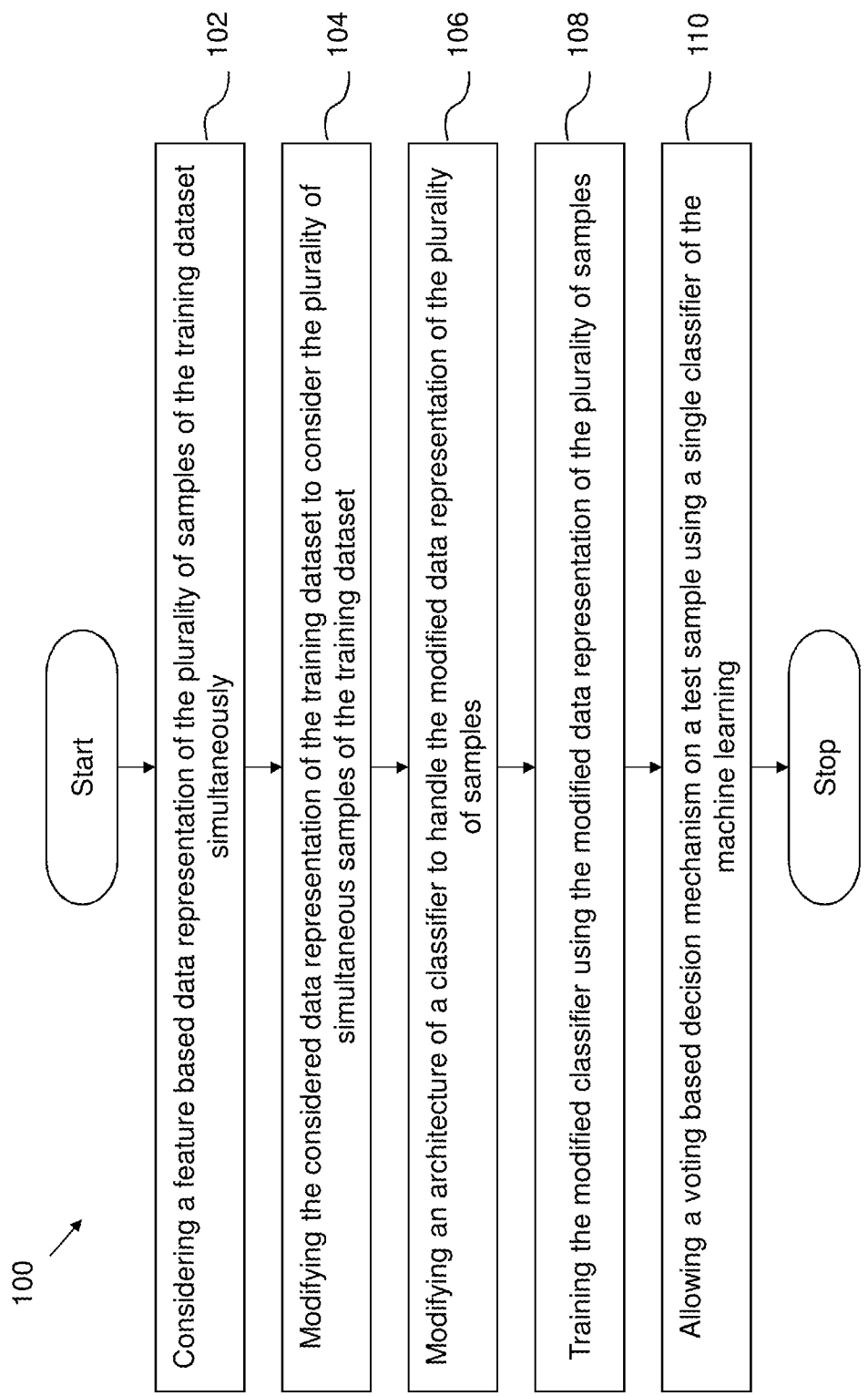
FIG. 1 is a flow diagram of a simultaneous multi-class learning based a feed forward artificial neural network architecture, according to an embodiment of the present subject matter.

Referring FIG. 1, a flow chart, illustrating a computer implemented method (100) to train the machine learning classifier using the plurality of samples in a training dataset. Generally, the machine learning algorithms require a training data to learn the discriminative characteristics between classes for the classification task.

Initially, at step (102), considering a plurality of samples simultaneously for a training dataset to the machine learning. The plurality of samples either comprising a balanced class or an imbalanced class distribution of the data. In the imbalanced class, total number of a class of data is far less than the total number of another class of data. This class imbalance can be observed in various disciplines including fraud detection, anomaly detection, medical diagnosis, oil spillage detection, facial expression etc. Additionally, the plurality of samples of the training dataset may be of a low resourced data. The low resource is a condition where it does not have sufficient training data to effectively train the machine learning classifier.

At the next step (104), more specifically a feature based data representation of the training samples is used for training the classifier. These features are extracted from the different class samples to reduce the redundant information in them, as well as to extract the relevant information from the raw samples, to better represent the classes having enough discriminative characteristics between them. The set of features used to represent the samples in the dataset varies from dataset to dataset (depending on the problem domain and task at hand).

At the next step (106), the considered data representation of the training dataset is modified to consider the plurality of simultaneous samples. The obtained modified data representation of the plurality of samples data where multiple instances of the same sample are generated by simultaneously considering more than one sample to form a larger dimension single sample.

In one example, for feature based data representation, considering two-class classification task with $C=\{C_1, C_2\}$. It denotes the set of class labels, and let $N_1$ and $N_2$ be the number of samples corresponding to $C_1$ and $C_2$ respectively. Herein, to train a classifier against data representation as simultaneous two sample data representation, the said samples in the training dataset to be provided as an input-output pair such as:

$$(\vec{x}_{ij}^T, C_i^T), i=1,2; \text{ and } j=1,2,\ldots N_i \quad (1)$$

where $\vec{x}_{ij} \in \Re^{d \times 1}$ refers to the d-dimensional feature vector representing the $j^{th}$ sample corresponding to $i^{th}$ class label, and $C^i \in C$, refers to output label of $i^{th}$ class.

$$([\vec{x}_{ij}, \vec{x}_{kl}]^T, [C_i, C_k]^T \forall i, k=1,2,\ldots; j=1,2,\ldots,N_i; l=1,2,\ldots,N_k) \quad (2)$$

Where $\vec{x}_{ij} \in \Re^{d \times 1}$ and $\vec{x}_{kl} \in \Re^{d \times 1}$ refer to the d-dimensional feature vectors representing the $j^{th}$ sample in $i^{th}$ class and $i^{th}$ sample in the $k^{th}$ class, respectively. $(C^i, C^k)$ C refers to output label of $i^{th}$ and $k^{th}$ class respectively. T refers to transpose of vector.

The input feature vector length in above data representation is of 2d i.e. $[\vec{x}_{ij}, \vec{x}_{kl}] \in \Re^{2d \times 1}$, and output class labels as either $[C_1, C_1]^T$, $[C_1, C_2]^T$, $[C_2, C_1]^T$, or $[C_2, C_2]^T$. It would be appreciated that by representing the data in the simultaneous two sample format, the number of samples in the training set exponentially increase to $(N_1+N_1)^2$ from $(N_1+N_1)$ samples. In addition to this, the simultaneous two sample data presentation is also hypothesized to provide the classifier with a better scope to learn the intra-class and inter-class variations.

In another example, considering the case where the two classes $C_1$ and $C_2$ are imbalanced with $C_1$ as majority class and $C_2$ as a minority class and $N_1=M$ and $N_2=N$ such as $M>>N$. Generally, the data is said to be class imbalanced if the imbalance ration (hereinafter read as "IR") is greater than 1.5 i.e. $N_1/N_2>1.5$. Herein, the number of samples generated by simultaneously considering two samples is $(M+N)^2$. It is to be noted that there is no oversampling, under-sampling or cost-sensitive parameter selection involved in the method and all samples from the normal training set are considered to train the classifier. Even in the majority constrained of simultaneous two samples, only the majority-majority combinations are constrained to form these combinations. Moreover, the number of samples (both majority and minority class) in the train set are exponentially increased from $(M+N)$ to $((3M+N)+N^2)$.

At the next step (108), an architecture of a classifier is modified to handle the modified data representation of the plurality of samples and training the modified classifier using the modified data representation of the plurality of samples.

In another embodiment, the modified architecture of the classifier includes a multilayer perceptron (MLP). The MLP is one of the most common feed forward neural network which has been successfully used in various classification tasks. The MLP herein, is considered as a base classifier to validate the plurality of samples data representation. The modified classifier comprises an input layer, a hidden layer and an output layer. The number of units in the input layer are equal to the length of the feature vector. The input layer of the modified classifier comprises same number of units as to accept the plurality of simultaneous samples of the training dataset. Similarly, the output layer comprising units double to number of simultaneous samples. The number of hidden layers and the units in the hidden layer are chosen depending upon the complexity of the problem and data availability.

Figure 2:
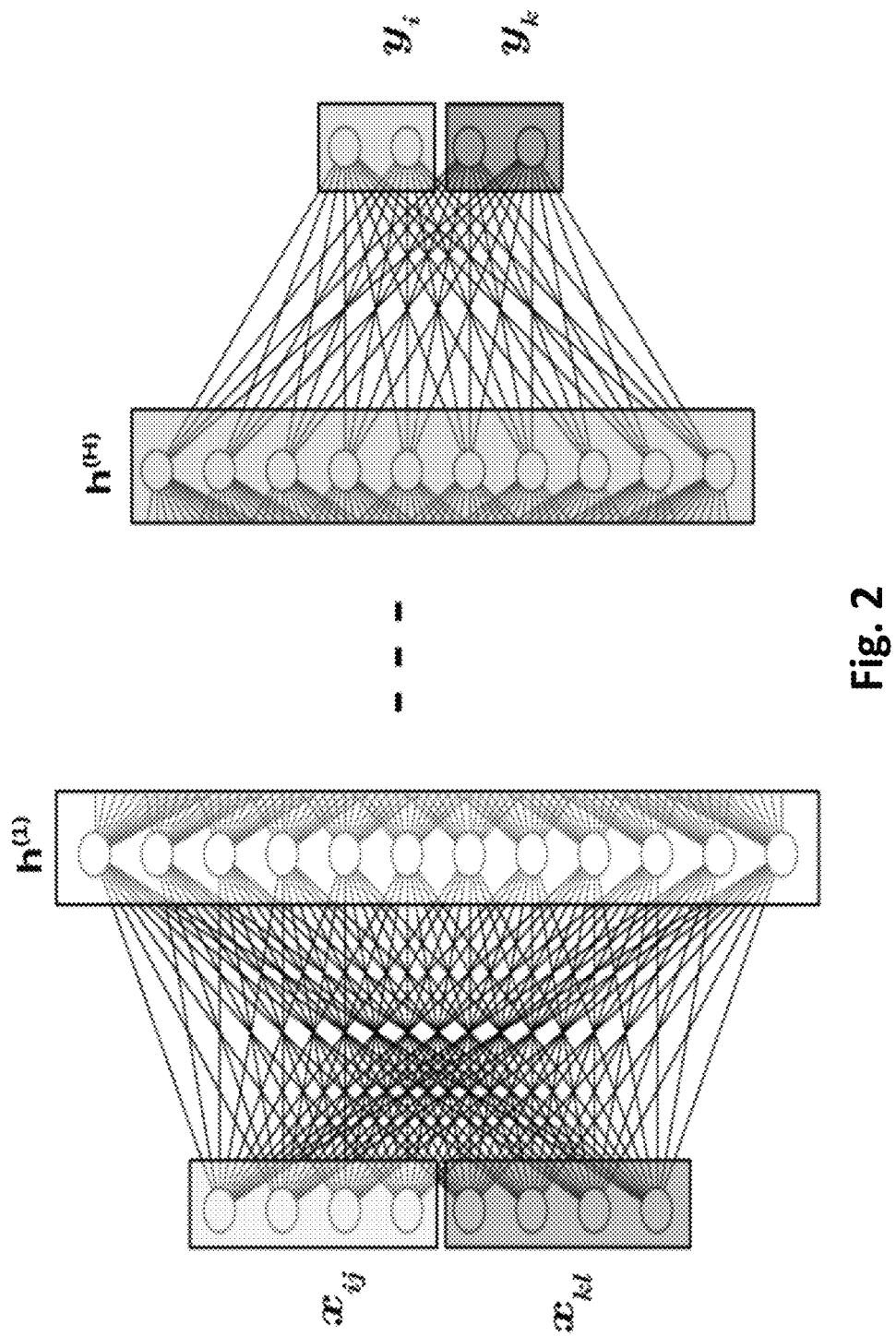
FIG. 2 depicts an example of a simultaneous two-class learning based feed forward artificial neural network, according to an embodiment of the present subject matter.

In an example, considering wherein a MLP for training using simultaneous two-class sample based data representation as shown in FIG. 2. The two-class samples in a simultaneous multi-class learning based feed forward artificial neural network which accepts two inputs at a time, herein each input is represented by a 4-dimensional feature vector combined together to form a 8-dimensional feature vector, with a 8-dimensional input layer, 'H' hidden layers and a dimensional output layer, where first two units in the output layer represent the output label of the one input and the other two units in the output layer represent the second input.

It would be appreciated that the MLP has 2d units in the input layer to accept the two samples. Further, the number of units in the hidden layer of MLP is selected empirically by varying the number of hidden units from two to twice the length of the input layer and the unit at which the highest performance is obtained are selected. The output layer will consist of units equal to twice the considered number of classes in the classification task, therefore, the output layer herein will have four units for two-class classification task.

Further at the step (110), the method is allowing a voting based decision mechanism on a test sample using a single classifier of the machine learning. It would be appreciated that, in the voting based decision mechanism, the plurality of samples of training dataset may include a modified test sample using one or more known reference samples. The one or more known reference samples can be selected from the training set or can also be samples which are not seen by the network during training. These are the samples which are correctly classified by the network with a high confidence. It is to be noted that the labels of these reference samples are known a priori.

Figure 3:
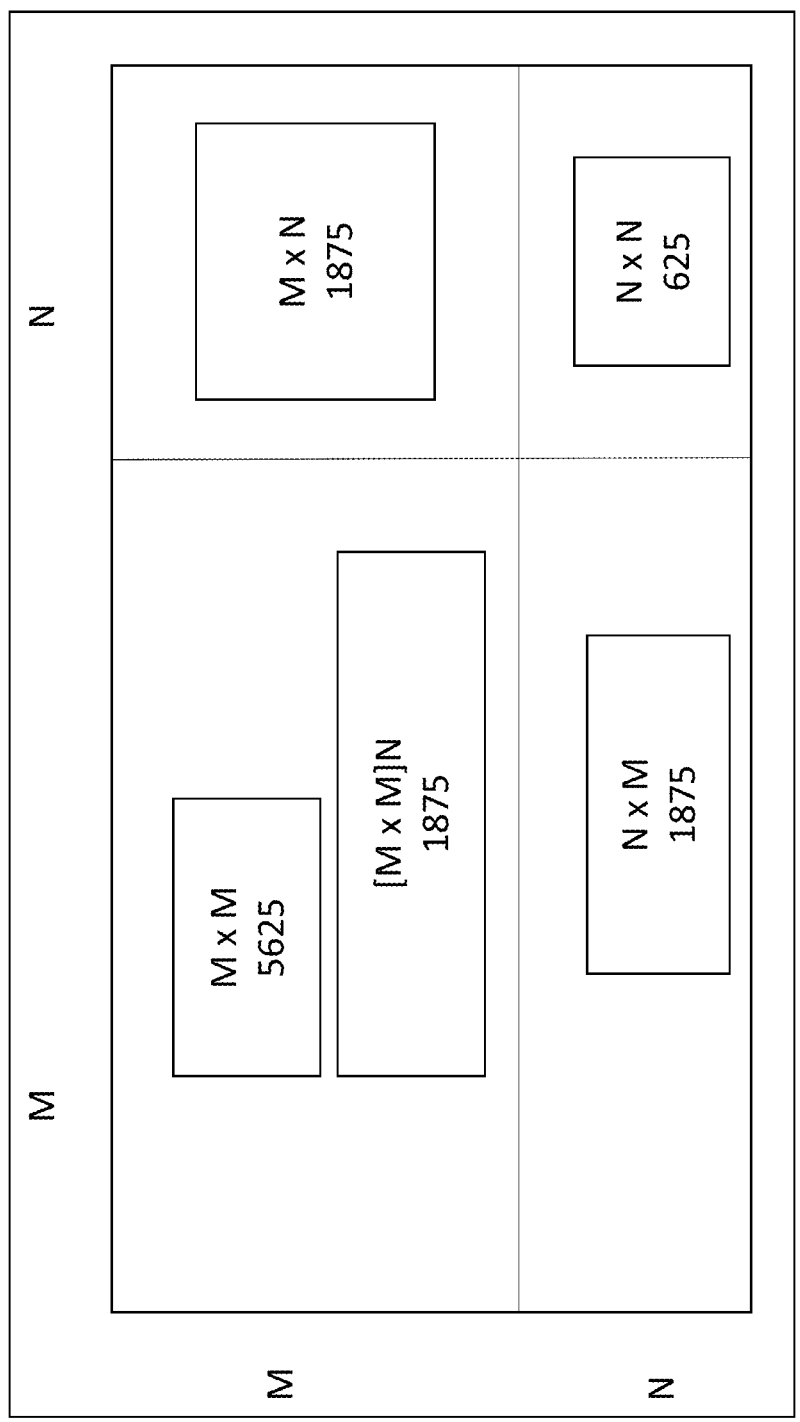
FIG. 3 illustrates an example of distribution of class samples across different combinations in a simultaneous multi-class learning based a feed forward artificial neural network, according to an embodiment of the present subject matter.
Figure 4:
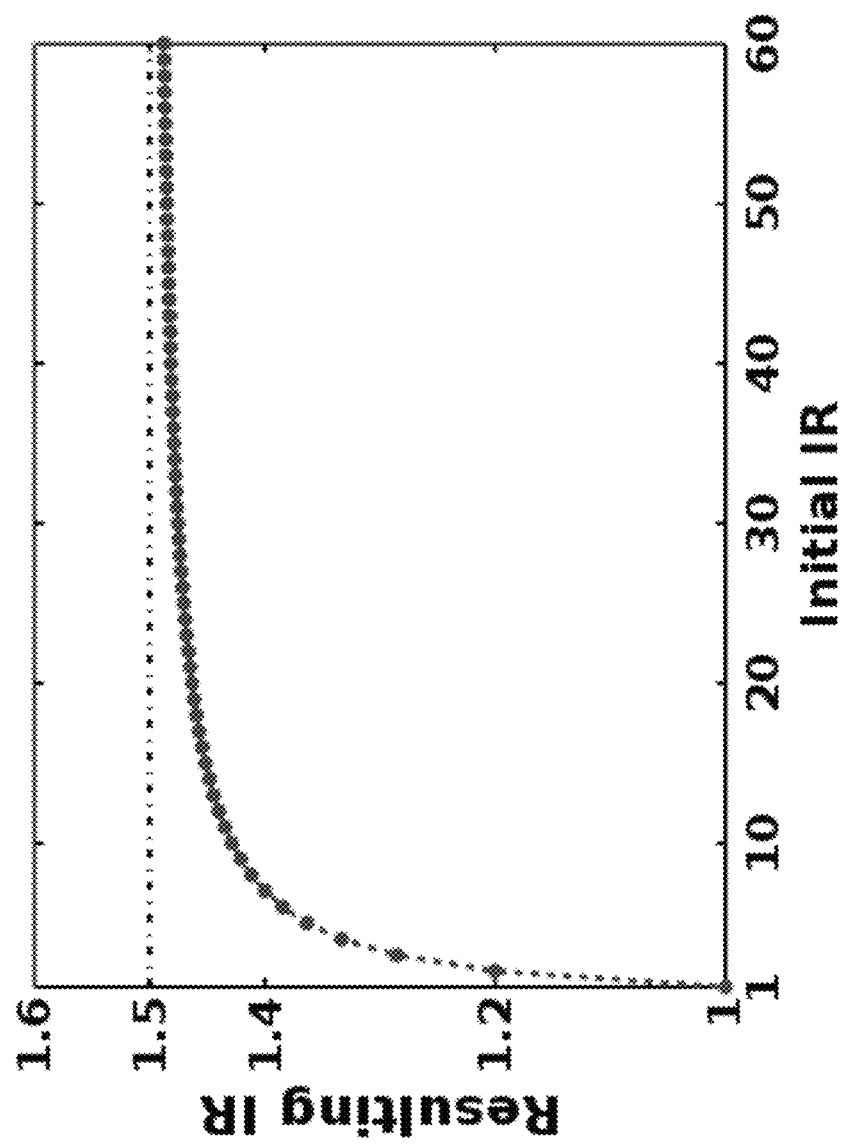
FIG. 4 shows the resulting IR obtained for majority constrained in a simultaneous two-class learning based a feed forward artificial neural network plotted against the corresponding initial IR values, according to an embodiment of the present subject matter.

In another example, considering two simultaneous samples comprising majority (M)=75 and minority (N)=25 as illustrated in FIG. 3. Representing the majority and majority sample combinations by combining each of the M samples corresponding to $C_1$ with only $M_N$ (where $M_N=N$) randomly chosen samples corresponding to class $C_i$. This modifies the number of majority-majority samples in the simultaneously two samples data representation to $M \times M_N = 1875$ while the number of samples in other combination remain the same. This modification in simultaneous two samples data representation called as majority-constrained of simultaneous two samples results in an IR value of 1.29 as shown in FIG. 4.

Referring table 1(a) & 1(b), as an example, wherein two different tasks namely, speech-music discrimination and emotion classification is considered to learn the differences between the classes when examples for training belonging to different classes are provided to the artificial neural network at the same time. A GTZAN music-speech dataset consisting of 120 audio files (60 speech and 60 music) for task of classifying speech and music. Each audio file of two second duration is represented using a 13-dimensional mel-frequency cepstral coefficient (MFCC) vector, where each MFCC vector is the average of all the frame level MFCC vectors. It is to be noted that this task is also to demonstrate the effectiveness, in particular for low resource data scenario. A standard Berlin speech emotion database consisting of 535 utterances corresponding to 7 different emotions is considered for the task of emotion classification. Each utterance is represented by a 19-dimensional feature vector obtained by applying the feature selection algorithm of WEKA toolkit on the 384-dimensional utterance level feature vector obtained by using openSMILE toolkit. It would be appreciated that for two class classification, two most confusing emotion pairs i.e. (neutral, sad) and (anger, happy) is being considered as two samples of the training dataset. The data corresponding to the speech (60)-music (60) discrimination and neutral (79)-sad (69) classification is balanced whereas the anger (127)-happy (71) classification suffers from class imbalance problem. There are four different proportions i.e. $(1/4)^{th}$, $(2/4)^{th}$ $(3/4)^{th}$ and $(4/4)^{th}$ of the training data are considered to train the machine learning classifier. Wherein, $(2/4)^{th}$ means considering only half of the original training data to train the machine learning classifier and $(4/4)^{th}$ means considering the complete training data. Further, a five-fold cross validation is considered for all data proportions. Accuracy is used as a performance measure for balanced data classification tasks (i.e. speech-music discrimination and neutral-sad emotion classification) whereas the more preferred F1 measure is used as a measure for imbalanced data classification task (i.e. anger-happy emotion classification).

TABLE 1(a)

| Task | | 1/4 | 2/4 | 3/4 | 4/4 |
|---|---|---|---|---|---|
| Speech- | MLP | 70.8 | 74.6 | 80.1 | 81.2 |
| Music | s2sL | 75.2 | 79.3 | 82.7 | 85.1 |
| Neutral- | MLP | 86.3 | 88.0 | 90.5 | 91.1 |
| Sad | s2sL | 90.4 | 91.2 | 92.1 | 92.9 |

TABLE 1(b)

| Task | | 1/4 | 2/4 | 3/4 | 4/4 |
|---|---|---|---|---|---|
| Anger- | MLP | .41 | .49 | .53 | .56 |
| Happy | s2sL | .54 | .60 | .64 | .69 |

The order in which the method(s) are described is not intended to be construed as a limitation, and any number of the described method blocks can be combined in any order to implement the method, or an alternative method. Additionally, individual blocks may be deleted from the methods without departing from the spirit and scope of the subject matter described herein. Furthermore, the method can be implemented in any suitable hardware, software, firmware, or combination thereof.

In an implementation, one or more of the method(s) described herein may be implemented at least in part as instructions embodied in a non-transitory computer-readable medium and executable by one or more computing devices. In general, one or more hardware processor(s) (for example a microprocessor) receives instructions, from a non-transitory computer-readable medium, for example, a memory, and executes those instructions, thereby performing one or more method(s), including one or more of the method(s) described herein. Such instructions may be stored and/or transmitted using any of a variety of known computer-readable media. The method can be implemented on computer, smart phones, tablets, kiosks and any other similar device.

The one or more hardware processor(s) may include circuitry implementing, among others, audio and logic functions associated with the communication. The one or more hardware processor(s) may include, among other things, a clock, an arithmetic logic unit (ALU) and logic gates configured to support operation of the processor(s). The one or more hardware processor(s) can be a single processing unit or a number of units, all of which include multiple computing units. The one or more hardware processor(s) may be implemented as one or more microprocessors, microcomputers, microcontrollers, digital signal processors, central processing units, state machines, logic circuitries, and/or any devices that manipulate signals based on operational instructions. Among other capabilities, the one or more hardware processor(s) is configured to fetch and execute computer-readable instructions and data stored in the memory.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional, and/or custom, may also be included.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory, may store any number of pieces of information, and data, used by the system to implement the functions of the system. The memory may be configured to store information, data, applications, instructions or the like for enabling the system to carry out various functions in accordance with various example embodiments. Additionally or alternatively, the memory may be configured to store instructions which when executed by the processor(s) causes the system to behave in a manner as described in various embodiments. The one or more modules includes routines, programs, objects, components, data structures, etc., which perform particular tasks or implement particular abstract data types. The memory may include programs or coded instructions that supplement applications and functions of the system.

The preceding description has been presented with reference to various embodiments. Persons having ordinary skill in the art and technology to which this application pertains appreciate that alterations and changes in the described structures and methods of operation can be practiced without meaningfully departing from the principle, spirit and scope.

What is claimed is:

1. A computer implemented method to train a machine learning classifier using a plurality of samples in a training dataset, wherein the method comprising one or more steps of:
   considering a feature based data representation of the plurality of samples of the training dataset simultaneously, wherein the plurality of samples comprising an imbalance class distribution dataset;
   modifying the considered data representation of the training dataset to consider the plurality of simultaneous samples of the training dataset by generating multiple instances of same sample by simultaneously considering more than one sample;
   modifying an architecture of a classifier to handle the modified data representation of the plurality of samples, wherein the modified architecture of the classifier includes a multilayer perceptron (MLP) that comprises an input layer, a hidden layer and an output layer, wherein the output layer comprising units equal to double the number of simultaneous samples; and
   training the modified classifier using the modified data representation of the plurality of samples.

2. The method of claim 1, further comprising:
   allowing a voting based decision mechanism on a test sample using a single machine learning classifier.

3. The method of claim 2, wherein the test sample is modified using one or more known reference samples wherein the one or more known reference samples could come from a plurality of samples in the training dataset.

4. The method of claim 1, wherein the modification of the classifier comprises same number of units in the input layer to accept the plurality of simultaneous samples of the training dataset.

5. The method of claim 1, wherein the plurality of samples comprises of low resourced data.

6. The method of claim 2, wherein the output of the classifier is subject to voting to decide the class of the test sample.

* * * * *